March 8, 1960 C. M. CAMPBELL, JR 2,927,733

GATING CIRCUITS

Filed Feb. 20, 1958 2 Sheets-Sheet 1

INVENTOR.
CARL M. CAMPBELL, JR.
BY Gordon R. Sanborn
AGENT

INVENTOR.
CARL M. CAMPBELL, JR.
BY Gordon R. Sanborn
AGENT

United States Patent Office 2,927,733

Patented Mar. 8, 1960

2,927,733

GATING CIRCUITS

Carl M. Campbell, Jr., Bryn Mawr, Pa., assignor to Burroughs Corporation, Detroit, Mich., a corporation of Michigan Application February 20, 1958, Serial No. 716,293

19 Claims. (Cl. 235—176)

Figure 1:
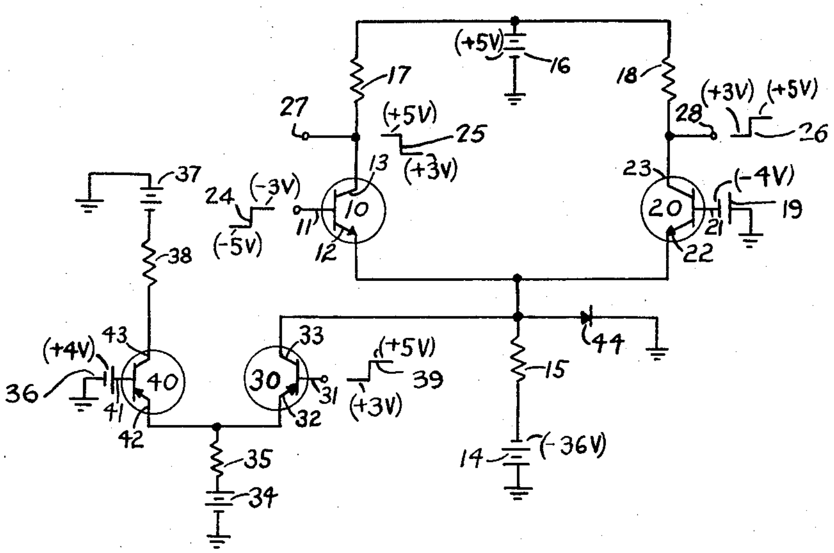

The present invention relates to gating circuits and more particularly to transistor signal gating circuits which can be used to perform binary addition.

Gating circuits find a wide variety of uses at the present time and particularly in electronic computing devices to perform such functions as the addition of binary numbers. In such uses a circuit capable of receiving two binary digits and the carry digit provided by a lower order unit is required to serve as a complete binary adding unit, such a circuit or unit being called a "full adder." A circuit capable of receiving only first and second binary digits and adapted to provide "sum" and "carry" output signals is termed a "half adder" since it cannot accommodate the carry digit provided by a lower order adding unit. Prior art half adders or full adders in which the binary digits and carry digits are simultaneously applied to the signal input points of the circuit have the advantage of providing rapid addition but generally require a relatively large number of signal gating components. Transistors have been used as the signal gating elements in binary adding circuits, but a relatively large number have generally been required to form a full adder. Since it is usually desirable to have a fast switching time in the adder, it is advantageous when using transistors to have a circuit which permits operation of the transistors in their nonsaturated region.

It is therefore an object of the present invention to provide an improved signal gating circuit utilizing transistors.

Another object of the present invention is to provide a signal gating circuit utilizing transistors in an arrangement in which the transistors may be operated in their nonsaturated region of operation.

A further object of the present invention is to provide a binary half adder utilizing transistors.

Still another object of the present invention is to provide a binary adding circuit utilizing transistors in an arrangement requiring a reduced number of transistors and in which the transistors may advantageously be maintained nonsaturated to provide rapid switching.

In accordance with the present invention a signal gating circuit is provided which includes a pair of junction transistors of one conductivity type having their emitters connected to a current source which may advantageously be substantially constant, and their base potentials so controlled that each transistor has two states of conduction, namely conductive or nonconductive. One or the other of the transistors thus tends to conduct and thereby carry the entire current provided by the current source. A third transistor of conductivity type opposite to that of the pair of transistors has its load circuit so connected to the emitters of the pair of transistors that conduction of the third transistor backwardly biases the emitter-base junctions of the first two transistors and thereby inhibits conduction of the first two transistors during conduction of the third transistor. Thus the third transistor serves to selectively inhibit the first and second transistors. To provide output signals which may similarly control the conduction of another pair of junction transistors, a fourth transistor of the same conductivity type as the third transistor has its emitter connected to the emitter of the third transistor and its base maintained at a fixed potential, thereby providing a circuit arrangement in which one or the other of the third or fourth transistors is conductive in accordance with the potential upon the base of the third transistor relative to the base potential of the fourth transistor.

The basic signal switching circuit of the present invention is readily adaptable to a gating arrangement wherein a first output signal is provided only when first and second input signals are simultaneously applied to the circuit, and a second output signal is provided only when one or the other and not both of the first and second input signals is applied to the circuit. Thus a binary half adder is provided. Through the use of two such half adders, a transistor full adder is provided.

Figure 2:
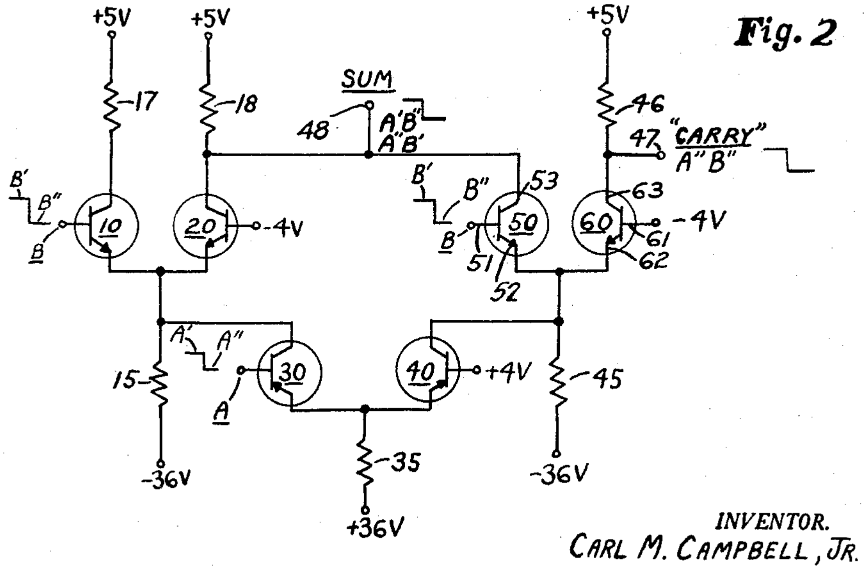
Figure 3:
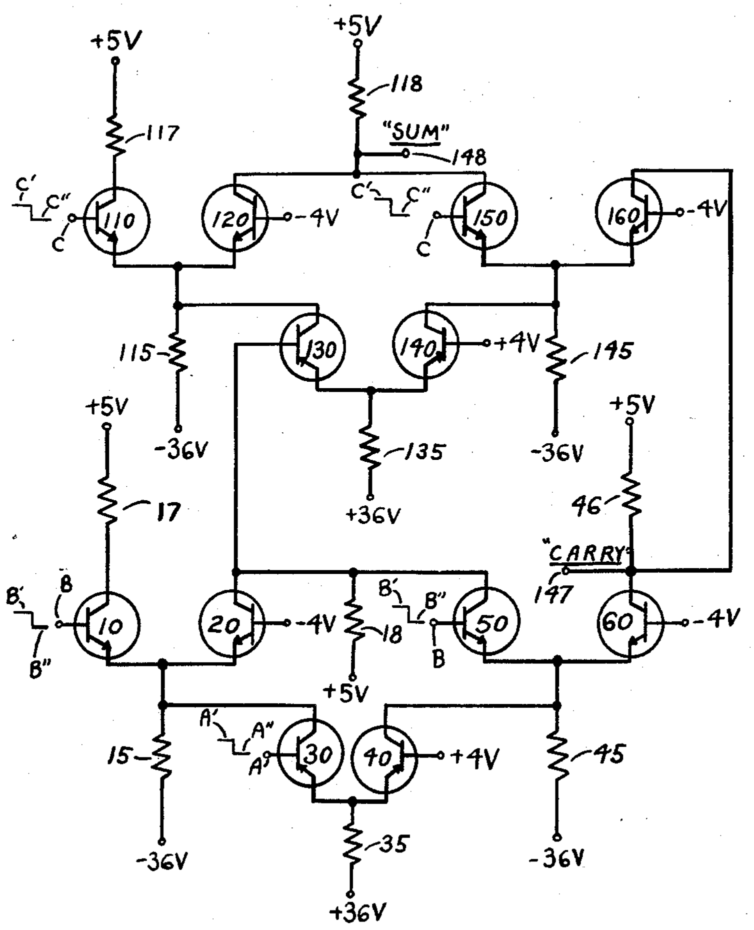
Figure 4:
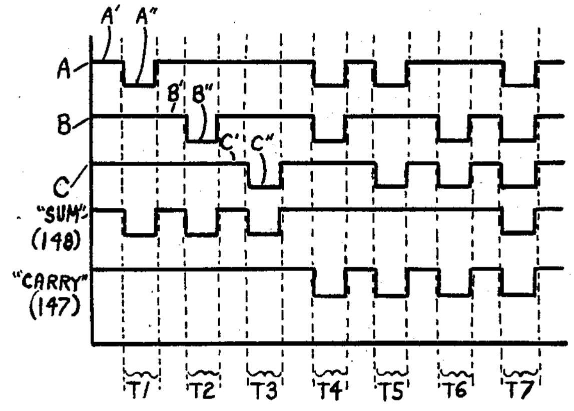

The features considered novel in the present invention are set forth in the appended claims. The invention itself, however, both as to its organization and operation as well as additional advantages and objects thereof will be more thoroughly understood from the following description when read in conjunction with the attached drawing, wherein like parts bear the same reference numeral throughout the various figures, and in which, Fig. 1 is a schematic circuit diagram of a transistor signal gating circuit provided in accordance with the present invention, Fig. 2 is a schematic circuit diagram of a gating arrangement which may be utilized as a binary half adder, Fig. 3 is a schematic representation of a gating circuit similar to that of Fig. 2 which may be utilized as a binary adder, and Fig. 4 is a signal diagram illustrating the operation of the circuit shown in Fig. 3.

Referring now to the drawing and in particular to Fig. 1 a pair of junction transistors shown for purpose of illustration as NPN transistors 10 and 20 having base electrodes 11 and 21, emitter electrodes 12 and 22, and collector electrodes 13 and 23, respectively, are so interconnected and biased that one of the pair tends to be conductive and thereby prevent conduction of the other. To this end the emitters 12 and 22 are directly interconnected and coupled with the negative terminal of a source of direct current (D.C.) potential illustrated as a battery 14 through a current limiting resistor 15, with the positive terminal of the battery 14 being connected to a point of reference potential hereinafter referred to as ground. The collector 13 is connected to the positive terminal of a second battery 16, the negative terminal of which is grounded, through a second impedance element illustrated as a load resistor 17. In like manner a third resistor 18 serves to interconnect the collector 23 of the second transistor and the positive terminal of the second battery 16. The base electrode 21 of the second transistor is maintained at a substantially constant potential which is positive with respect to the negative terminal of the battery 14 by being connected to the negative terminal of a third source of potential illustrated as a battery 19 having its positive terminal grounded. The base 11 of the first transistor 10 is adapted to receive positive going control signals, and is further adapted to be maintained at a potential which is slightly negative with respect to the base potential of the second transistor in the absence of such positive going control signals. The circuit arrangement required to maintain the base 11 at a quiescent potential which is slightly negative with respect to the potential of the base 21 is well known in the art, and therefore is not illustrated in the drawing.

To further illustrate the potentials maintained at the various points throughout the circuit of Fig. 1, a set of potential values is illustrated in parentheses. It is thus seen that in the absence of an input signal 24 the base potentials are positive with respect to the negative terminal of the battery 14, with the base 11 being more negative than the base 21. Thus the second transistor 20 is conductive and the first transistor 10 is nonconductive. First and second output signals 25 and 26 may be obtained at signal output terminals 27 and 28, respectively, which are respectively connected to the collectors 13 and 23. When a positive going control signal 24 is applied to the base 11 to place the base of the first transistor at a more positive potential than the base of the second transistor the states of conduction of the two transistors will be interchanged, with the first transistor then being conductive and the second nonconductive.

A third junction transistor of conductivity type opposite to that of the first and second transistors serves to selectively inhibit or prevent conduction of the first and second transistors. Thus a third PNP junction transistor 30 having a collector electrode 33 connected to the current limiting resistor 15, an emitter electrode 32 connected to the positive terminal of a battery 34 through a dropping resistor 35, and a base electrode 31 adapted to receive control signals, serves to selectively increase the current flow through the current limiting resistor 15 and thereby provide a potential upon the emitters 12 and 22 which is positive with respect to the potentials upon the bases 11 and 21. In order that signals of relatively small amplitude may be used to control the transistor 30, the emitter 32 is effectively limited to a potential which is normally either slightly positive or slightly negative with respect to the quiescent potential maintained upon the base 31. The voltage limiting action upon the emitter 32 can be provided in a number of ways, and in Fig. 1 is illustrated as being provided by a fourth PNP junction transistor 40 having an emitter electrode 42 connected to the emitter 32, a base electrode 41 maintained at a substantially constant potential by battery 36 and a collector electrode 43 connected to the negative terminal of a battery 37 by a load resistor 38. If it is desired that the transistors 10 and 20 be normally inhibited or prevented from conducting, the base 41 is maintained positive with respect to the base 31, and therefore the transistor 30 is normally conductive and the transistor 40 normally non-conductive. Hence the emitter-collector current of the third transistor 30 passing through the resistor 15 serves to maintain the emitters 12 and 22 at a potential which is more positive than the most positive potential applied to the base 11. When a positive going control signal 39 is applied to the base 31 to make it more positive than base 41 the third transistor 30 is rendered nonconductive and the fourth transistor 40 is rendered conductive. Hence the inhibiting signal upon the first and second transistors is removed. The circuit can thus be used as a gate, with output signals from the signal output terminals 27 and 28 being provided only during the occurrence of signals upon the bases 11 and 31.

From the above set forth bias conditions it is seen that transistors 10 and 20 are in opposite states of conduction only in the absence of an inhibiting signal. If the base 41 is maintained negative with respect to the quiescent potential of the base 31, such an inhibiting signal will be provided upon the emitters 12 and 22 only during the application of a negative going control signal to the base 31 or a positive going signal to the base 41.

The impedance of the resistors in Fig. 1 and the various potentials are so selected that transistor saturation is avoided. To further insure nonsaturation a diode 44 may be included in the circuit between the emitters of transistors 10 and 20 and signal ground in the manner illustrated, with the cathode of the diode being grounded.

If a second pair of NPN transistors are coupled with the collector of the fourth transistor 40 in a manner similar to that in which the first pair is coupled with the third transistor, a binary half adder may be readily provided. Such a half adder is illustrated in Fig. 2. Thus fifth and sixth NPN transistors 50 and 60 having their emitter electrodes 52 and 62 connected to the collector 43 of the fourth transistor and also connected to a negative potential by a current limiting resistor 45 are adapted to be inhibited by conduction of transistor 40. The transistor 60 has a base 61 maintained at a negative potential and a collector 63 coupled to a source of positive potential by a load resistor 46. The fifth transistor 50 has a base electrode 51 adapted to receive control signals and to be maintained at a potential which is slightly positive with respect to the potential of the base 61 in the absence of control signals, and a collector electrode 53 connected to the load resistor 18 and to the collector of the transistor 20. In Fig. 2 a particular set of values for the various potentials throughout the circuit is shown by way of example.

A first signal input terminal A is connected to the base of transistor 30 for conveying control signals to the transistor 30 which are of the proper amplitude and polarity to selectively render the transistor 30 conductive, with the quiescent potential upon the base of transistor 30 being positive with respect to that upon the base of transistor 40. In like manner second signal input terminals B are connected to the base electrodes of the transistors 10 and 50 for simultaneously conveying negative going control signals to the transistors 10 and 50 to selectively tend to render the transistors 10 and 50 nonconductive, the quiescent potential upon the bases of transistors 10 and 50 being more positive than that of transistors 20 and 60. A first signal output terminal 47 connected to the collector 63 of the transistor 60 provides "Carry" output signals only when input signals are present at the signal input terminals A and B. A second signal output terminal 48 connected to the collectors of the transistors 20 and 50 provides an output signal when there is an input signal upon the signal input terminal A or the terminals B, but not when there is a signal upon each of the signal input terminals A and B. Since the potentials upon the bases of transistors 10 and 50 are always the same, the two B terminals may be connected together to provide a single input terminal. Reference will therefore be made hereinafter to such a single B input terminal.

In the absence of control signals the potential of the signal input terminal A may be represented as a potential A′ and the potential of the input terminal B as a potential B′. Under such conditions of no input signal the transistor 40 is conductive, thereby inhibiting conduction of the transistors 50 and 60, with the base of transistor 50 being more positive than the base of transistor 60. Since the transistor 40 is conducting the transistor 30 is nonconducting and hence the transistors 10 and 20 are not inhibited. The base of the transistor 10 is more positive than the base of the transistor 20 and therefore the transistor 20 remains nonconductive while the transistor 10 conducts. As a result no current flows through resistors 18 and 46 and thus the potentials of the signal output terminals 48 and 47 are each at a positive 5 volts in the embodiment illustrated.

When an input signal is applied only to the signal input terminal A to change the potential of the base of the transistor 30 to the potential A″, the transistor 30 becomes conductive and thereby inhibits conduction of the transistors 10 and 20. Conduction of the transistor 30 renders the transistor 40 non-conductive and hence the inhibiting signal upon the emitters 52 and 62 is removed. Thus the transistor 50 becomes conductive due to the base potential B′ while the transistor 60 remains nonconductive. Thus current flows through resistor 18 and a signal is provided only at the signal output terminal 48 in response to the signal condition A″B′ upon the signal input terminals. In like manner a potential A′ upon the base of the transistor 30 and B'' upon the bases of the transistors 10 and 50 causes a circuit condition wherein the transistor 40 conducts and inhibits transistors 50 and 60, while the transistor 20 conducts to provide an output signal upon the signal output terminal 48 corresponding to the signal conditions A'B''. It is thus seen that when a negative going control signal is applied to the signal input terminal A or to the signal input terminal B a "sum" output signal is provided at the signal output terminal 48, with the potential of the signal output terminal 47 remaining unchanged. If it is desired to distinguish the two output signals corresponding to A'B'' and A''B', a separate resistor is connected to collector 53 in place of connecting collector 53 to resistor 18.

When a potential B'' is applied to the bases of the transistors 10 and 50 and simultaneously a potential A'' is applied to the base of the transistor 30, the circuit changes to the condition wherein the transistor 30 is conductive and thereby prevents conduction of the transistors 10 and 20. Conduction of the transistor 30 renders the transistor 40 non-conductive to permit conduction of one or the other of the transistors 50 or 60. Due to the potential B'' upon the base of the transistor 50, the base of the transistor 60 is more positive than the base of the transistor 50 and therefore the transistor 60 becomes conductive. Hence a negative going "Carry" output signal is provided at the signal output terminal 47 while the potential of the signal output terminal 48 remains unchanged. Therefore a "Sum" output signal is provided only in response to the signal conditions A'B'' or A''B' and not in response to the signal condition A''B'', while a "Carry" output signal is provided only in response to the signal condition A''B''. Thus the circuit of Fig. 2 functions as a binary half adder. It is of course evident that various combinations of input signals could be applied to control the circuit. Thus the base of transistor 30 could be maintained fixed and positive going control signals applied to the base of transistor 40 to render it nonconductive, and the bases of transistors 10 and 50 fixed and positive going signals applied to transistors 20 and 60.

By combining two circuits similar to that illustrated in Fig. 2 in an arrangement as illustrated in Fig. 3, a full adder circuit is provided. In Fig. 3 the transistors and resistors additional to those illustrated in Fig. 2 are identified by reference numerals corresponding to the elements in Fig. 2 but bearing reference numerals in the 100 series.

Thus in Fig. 3 a third pair of NPN transistors 110 and 120 have their emitter electrodes connected to the collector of a ninth PNP transistor 130 having its emitter connected to the emitter of a tenth PNP transistor 140. Transistor 140 serves to control the conduction of 11th and 12th NPN transistors 150 and 160 by having its collector connected to the emitters of the transistors 150 and 160. The bases of the transistors 120, 140, and 160 are maintained at fixed potentials, the bases of the transistors 110 and 150 are connected to third signal input terminals C and are adapted to be maintained at a quiescent potential which is positive with respect to the fixed potential upon the bases of the transistors 120 and 160, and the base of the transistor 130 is connected to the collectors of the transistors 20 and 50 and hence to the resistor 18. The signal input terminals C are always at the same potential, and therefore may be interconected to provide a single terminal C. Thus reference will be made hereinafter to a single input terminal C. In a manner analogous to that of Fig. 2, a resistor 115 is connected to the emitters of the transistors 110 and 120, a resistor 135 is connected to the emitters of the transistors 130 and 140, a resistor 145 is connected to the emitters of the transistors 150 and 160, and a resistor 118 is connected to the collectors of the transistors 120 and 150. A "Sum" signal output terminal 148 is connected to the resistor 118 and thus to the collectors of transistors 120 and 150. A "Carry" signal output terminal 147 is connected to the collectors of the transistors 60 and 160, which are directly interconnected, and thus to the load resistor 46 which is common to transistors 60 and 160.

The operation of the circuit of Fig. 3 will be described in conjunction with the signal waveforms illustrated in Fig. 4.

In the absence of any input signals the base of the transistor 30 is more positive than the base of the transistor 40 and therefore the transistor 40 conducts and inhibits conduction of the transistors 50 and 60, such conduction of transistor 40 maintaining transistor 30 nonconductive and thereby permitting conduction of one or the other of the transistors 10 and 20. Since the potential B' upon the base of the transistor 10 is more positive than the fixed potential upon the base of the transistor 20 the transistor 10 conducts and the transistor 20 remains nonconductive. Hence no current flows through the load resistor 18 and therefore the base of the transistor 130 remains positive with respect to the potential upon the base of transistor 140, causing transistor 130 to be nonconductive and transistor 140 conductive. Thus conduction of transistors 150 and 160 is inhibited while conduction of one or the other of transistors 110 and 120 is permitted. As a result of the potential C' upon the base of the transistor 110, the transistor 110 conducts and transistor 120 remains nonconductive. Therefore there is no current flow through resistors 46 and 118 and the potentials of the signal output terminals 148 and 147 remain unchanged.

If at a time $t_1$ a signal potential A'' is applied to input terminal A and thus to the base of transistor 30, the transistor 30 will be rendered conductive and transistor 40 nonconductive. Conduction of transistors 10 and 20 is thus prevented while transistor 50 is permitted to conduct as a result of the base potential B' and the nonconduction of transistor 40. Therefore current flows through resistor 18 to provide a more negative potential upon the base of transistor 130 to render it conductive and inhibit conduction of transistors 110 and 120. Conduction of transistor 130 renders transistor 140 nonconductive and thereby permits transistor 150 to conduct in response to the potential C' maintained thereon in the absence of control signals applied to the signal input terminal C. Thus current flows through the load resistor 118 and a "Sum" output signal is provided. Transistors 60 and 160 are seen to be nonconductive and therefore a "Carry" signal is prevented.

If an input signal B'' is applied only to the input terminal B at a time $t_2$, transistor 40 will be conductive and inhibit transistors 50 and 60 while transistor 30 will remain nonconductive as a result of base potential A', thereby permitting transistor 20 to conduct in response to its base being more positive than the potential B'' upon the base of transistor 10. Hence current flows through resistor 18 which provides a signal upon the base of transistor 130 to render transistor 130 conductive and transistor 140 nonconductive. Transistors 110 and 120 are therefore inhibited from conducting and one or the other of transistors 150 and 160 conducts. Since the base of transistor 150 is at a potential C' which is positive with respect to the base of transistor 160, transistor 150 conducts and transistor 160 is maintained nonconductive. Thus a "Sum" output signal is provided at terminal 148, with the potential of the "Carry" output terminal 147 remaining unchanged.

If a signal is applied only to input terminal C at a time $t_3$, transistors 110 and 150 will tend to be nonconductive and transistors 120 and 160 will tend to conduct. Transistor 140 conducts and inhibits 150 and 160 and thereby prevents a "Carry" signal as a result of current flow through transistor 160, and transistor 130 remains nonconductive to permit transistor 120 to conduct. Thus a "Sum" signal is provided. A "Carry" signal associated with current flow through transistor 60 is prevented since transistor 40 is conductive and inhibits transistors 50 and 60.

It is therefore seen that only a "Sum" output signal is provided in response to the application of an input signal to only one of the input points A, B, or C.

When input signals are simultaneously present at terminals A and B, for example at time $t_4$, transistor 30 inhibits transistors 10 and 20 and transistor 50 is nonconductive to maintain transistor 60 conductive, and thereby providing a "Carry" signal across resistor 46. A "sum" signal is prevented since transistor 140 inhibits transistors 150 and 160 and transistor 110 conducts to prevent conduction of transistor 120.

If at time $t_5$ signals are applied to A and C, transistor 30 conducts to inhibit transistors 10 and 20, transistor 40 remains nonconductive to permit transistor 50 or 60 to conduct, transistor 50 conducts in response to base potential B′ and thereby maintains transistor 60 nonconductive, transistor 130 conducts in response to current flow through resistor 18 associated with conduction of transistor 50, transistors 110 and 120 are inhibited by conduction of transistor 130, transistor 140 remains nonconductive, transistor 150 is maintained nonconductive by signal potential C″, and transistor 160 conducts to provide current flow through resistor 46. Thus only a "Carry" output signal is produced.

When control signals are simultaneously applied to input points B and C during time interval $t_6$, the following circuit conditions exist: transistor 40 conducts and thereby inhibits conduction of transistors 50 and 60, transistor 30 remains nonconductive due to potential A′ and therefore permits conduction of transistor 10 or 20, transistor 10 is maintained nonconductive by input signal potential B″ and therefore transistor 20 conducts causing current flow through resistor 18, transistor 130 conducts due to the lowered base potential associated with current flow through resistor 18 and therefore conduction of transistors 110 and 120 is prevented, transistor 140 remains nonconductive due to conduction of transistor 130, signal potential C″ maintains transistor 150 nonconductive which causes transistor 160 to conduct and provide a "Carry" output signal.

It is therefore seen that when any two, but only two, of the input signal points are supplied with negative going control signals that only a "Carry" output signal is produced.

If negative going control signals are simultaneously present at all three signal input points, as is illustrated in Fig. 4 during the time interval $t_7$, a "Sum" and a "Carry" output signal are produced in the following manner: potential A″ renders transistor 30 conductive to inhibit transistors 10 and 20, transistor 40 becomes nonconductive and thus permits transistor 50 or 60 to conduct, transistor 50 remains nonconductive due to signal potential B″ and therefore transistor 60 conducts to provide current flow through resistor 46 and hence a "Carry" signal; transistor 130 remains nonconductive to permit transistor 110 or 120 to conduct, transistor 110 remains nonconductive due to the signal C″ and therefore transistor 120 conducts causing a "Sum" output signal, and transistors 150 and 160 remain nonconductive as a result of conduction of transistor 140. Thus if two of the signal input points are provided with signals corresponding to the presence or absence of first and second binary digits and the third signal input terminal provided with "Carry" information from a preceding stage, the circuit of Fig. 3 serves as a full binary adder.

To simplify the drawings, the diode of Fig. 1 has not been included in the circuits shown in Figs. 2 and 3. Similar clamps may be incorporated to insure nonsaturation of the transistors. The resistance of the resistors and amplitude of the potentials for the circuits may advantageously be selected, however, to avoid transistor saturation. The following values for the resistors in the circuit of Fig. 3 which were used with the various voltages illustrated in the drawing are included as an example of one circuit constructed in accordance with the present invention.

| | Ohms |
|---|---|
| Resistors **35** and **135** | 3400 |
| Resistors **15**, **45**, **115**, and **145** | 4750 |
| Resistors **17**, **18**, **117**, **118**, and **146** | 499 |

There has thus been disclosed an improved signal gating circuit which is capable of performing binary addition, with the circuit being compatible with transistors operated in their nonsaturated region of operation to provide fast switching or signal gating action.

What is claimed is:

1. A gating circuit comprising: first and second junction transistors of one conductivity type and a third junction transistor of another conductivity type, each of said transistors having a base, an emitter, and a collector; and an impedance element connected to the emitters of said first and second transistors and to the collector of said third transistor for providing an inhibiting signal upon the emitters of said first and second transistors in response to conduction of said third transistor.

2. A gating circuit in accordance with claim 1 wherein said impedance element is a resistor and including a source of potential connected to said resistor to provide a substantially constant current source.

3. A gating circuit comprising in combination: a first junction transistor having a load circuit and a control electrode; a first impedance element connected to said load circuit adapted to provide a first signal in response to conduction of said transistor; second and third junction transistors of conductivity type opposite that of said first transistor and each having an emitter connected to said impedance element, a base, and a collector; and means maintaining said second and third transistors nonconductive in response to said signal and maintaining one of said second and third transistors conductive in the absence of said signal.

4. A gating circuit comprising in combination; first and second junction transistors of one conductivity type and a third transistor of another conductivity type, each of said transistors having an emitter, a collector, and a base; a resistive impedance element connected to the emitters of said first and second transistors and to the collector of said third transistor; bias means connected to said impedance element and said transistors providing a signal across said impedance element in response to conduction of said third transistor; and means rendering one or the other of said first and second transistors conductive in the absence of said signal and further rendering each of said first and second transistors nonconductive in response to said signal.

5. A gating circuit comprising: a first junction transistor having a base electrode maintained at a substantially constant potential, an emitter electrode, and a collector electrode; a second junction transistor of the same conductivity type as said first transistor and having an emitter electrode connected to the emitter electrode of said first transistor, a base electrode adapted to receive control signals, and a collector electrode; a third junction transistor of conductivity type different from that of said first transistor and having a base electrode adapted to receive control signals, an emitter electrode, and a collector electrode; and a resistive impedance element connected to the emitters of said first and second transistors and to the collector of said third transistor adapted to inhibit conduction of said first and second transistors in response to conduction of said third transistor.

6. A signal gating circuit as defined in claim 5 and including voltage limiting means connected to the emitter of said third transistor.

7. A signal gating circuit as defined in claim 6 wherein said voltage limiting means includes a fourth transistor of the same conductivity type as said third transistor having an emitter connected to the emitter of said third transistor and a base maintained at a substantially constant potential.

8. A signal gating circuit comprising; first and second transistors of one conductivity type and third and fourth transistors of another conductivity type, each of said transistors having a base, an emitter, and a collector; first and second signal input circuits respectively connected to the bases of said first and third transistors; bias means maintaining the bases of said second and fourth transistors at substantially constant potentials; a first resisitive impedance element connected to the emitters of said third and fourth transistors; and a second resistive impedance element connected to the emitters of said first and second transistors and to the collector of one of said third or fourth transistors.

9. A signal gating circuit comprising in combination: first and second NPN transistors each having a base, an emitter, and a collector; a first resistor connected to a source of potential and to the emitters of said transistors; means maintaining the base of said second transistor at a substantially constant potential; first and second PNP transistors each having a base, an emitter, and a collector; a second resistor connected to a source of potential and to the emitters of said PNP transistors; means maintaining the base of said first PNP transistor at a substantially constant potential; means connecting the collector of said second PNP transistor to the emitters of said NPN transistors; and first and second signal input circuit means connected respectively to the base of said first NPN transistor and to the base of said second PNP transistor.

10. A signal gating circuit as defined in claim 9 and including: third and fourth NPN transistors each having a base, an emitter, and a collector; a third resistor connected to a source of potential, to the emitters of said third and fourth transistors, and to the collector of said first PNP transistor; and means maintaining the base of said third NPN transistor at a substantially constant potential.

11. A signal gating circuit comprising: first and second junction transistors of the same conductivity type each having a base, an emitter, and a collector; a first resistive impedance element connected to each of said emitters; third and fourth junction transistors of the same conductivity type as said first transistor and each having a base, an emitter, and a collector; a second resistive impedance element connected to the emitters of said third and fourth transistors; fifth and sixth junction transistors of conductivity type opposite to that of said first transistor and each having a base, an emitter, and a collector; means connecting the collector of said fifth transistor to the emitters of said first and second transistors and the collector of said sixth transistor to the emitters of said third and fourth transistors; a third resistive impedance element connected to the emitters of said fifth and sixth transistors; and signal input means connected to the bases of said first, third, and one of said fifth or sixth transistors.

12. In a gating circuit the combination which comprises: first and second semiconductor signal translating devices each having first and second states of conduction; means maintaining said devices in opposite states of conduction; a first signal input circuit connected to one of said devices to convey first signals thereto for selectively placing said one in a selected state of conduction; third and fourth semiconductor signal translating devices each having two states of conduction; means responsive to the state of conduction of said first device maintaining said third and fourth devices in opposite states of conduction when said first device is in its first state of conduction and maintaining said third and fourth devices in the same state of conduction when said first device is in its second state of conduction; fifth and sixth semiconductor signal translating devices each having two states of conduction; means responsive to the state of conduction of said second device maintaining said fifth and sixth devices in opposite states of conduction when said second device is in its first state of conduction and maintaining said fifth and sixth devices in the same state of conduction when said first device is in its second state of conduction; and a second signal input circuit connected to said third and fifth devices to convey second signals thereto for selectively placing said third device in a selected state of conduction when said first device is in its first state of conduction and for selectively placing said fifth device in a selected state of conduction when said second device is in its first state of conduction.

13. In a gating circuit the combination as defined in claim 12 wherein said first and second devices are transistors of one conductivity type and said third, fourth, fifth and sixth devices are transistors of another conductivity type.

14. A signal gating circuit comprising in combination: first and second transistors of the same conductivity type; means maintaining said transistors in opposite states of conduction; a first signal input circuit connected to one of said transistors; third and fourth transistors of conductivity type opposite to that of said first transistor; means preventing conduction of said third and fourth transistors when said first transistor is conductive; means maintaining said third and fourth transistors in opposite states of conduction when said first transistor is nonconductive; fifth and sixth transistors of conductivity type opposite to that of said first transistor; means preventing conduction of said fifth and sixth transistors when said second transistor is conductive; means maintaining said fifth and sixth transistors in opposite states of conduction when said second transistor is nonconductive; a first signal output circuit connected to said sixth transistor; a second signal output circuit connected to said fourth and fifth transistors; and a second signal input circuit connected to said third and fifth transistors.

15. In a binary half adder circuit having a first signal input circuit for receiving a first signal representative of a first binary digit and a second signal input circuit for receiving a second signal representative of a second binary digit, the combination comprising: first and second transistors of the same conductivity type; means maintaining said first transistor conductive only during the presence of said first signal and said second transistor conductive only during the absence of said first signal; third and fourth transistors of conductivity type opposite to that of said first transistor; means responsive to current flow through said second transistor preventing conduction of said third and fourth transistors when said second transistor is conductive; means maintaining said third transistor conductive and said fourth transistor nonconductive in the absence of said second signal when said second transistor is nonconductive; means maintaining said third transistor nonconductive and said fourth transistor conductive in response to said second signal when said second transistor is nonconductive; a first signal output circuit developing a "carry" output signal only in response to conduction of said fourth transistor; fifth and sixth transistors of conductivity type opposite to that of said first transistor; means responsive to current flow through said first transistor preventing conduction of said fifth and sixth transistors when said first transistor is conductive; means maintaining said sixth transistor conductive and said fifth transistor nonconductive in the absence of said second signal when said first transistor is nonconductive; means maintaining said sixth transistor nonconductive and said fifth transistor conductive in response to said second signal when said first transistor is nonconductive; and a second signal output circuit developing a "sum" output signal in response to conduction of said third or said fifth transistor.

16. A signal gating circuit having first and second signal input points for receiving first and second input signals and adapted to provide a first output signal only in response to the simultaneous application of the first and second input signals and to provide a second output signal in response to the application of either but not both of the first and the second input signals, comprising in combination: first and second junction transistors of one conductivity type and third, fourth, fifth, and sixth junction transistors of another conductivity type, each of said transistors having a base, an emitter, and a collector; a first resistive impedance element connected to the emitters of said first and second transistors; a second resistive impedance element connected to the emitters of said third and fourth transistors and to the collector of said first transistor; a third resistive impedance element connected to the emitters of said fifth and sixth transistors and to the collector of said second transistor; impedance means connected to the collectors of said third, fourth, fifth and sixth transistors; bias means maintaining the base of one of said first and second, one of said third and fourth, and one of said fifth and sixth transistors at substantially constant potentials; means connecting the first signal input point to the base of one of said third and fourth transistors and to the base of one of said fifth and sixth transistors, and means connecting the second signal input point to the base of one of said first and second transistors.

17. A half adder comprising in combination: first, second, third, and fourth transistors of one conductivity type and fifth and sixth transistors of another conductivity type, each of said transistors having a base, an emitter, and a collector; a first resistor connected to the emitters of said first and second transistors, to the collector of said fifth transistor, and to a source of potential; a second resistor connected to the emitters of said third and fourth transistors, to the collector of said sixth transistor, and to a source of potential; a third resistor connected to the emitters of said fifth and sixth transistors, and to a source of potential; first signal input circuit means connected to the bases of said first and third transistors for conveying first binary signals thereto; second signal input circuit means connected to the base of said fifth transistor for conveying second binary signals thereto; bias means maintaining the bases of said second, fourth, and sixth transistors at substantially constant potentials; a first signal output circuit connected to the collectors of said second and third transistors for developing a "sum" output signal in response to a change in the state of conduction of said second or third transistor; and a second signal output circuit connected to the collector of said fourth transistor for developing a "carry" output signal in response to a change in the state of conduction of said fourth transistor.

18. A circuit for performing binary addition which comprises: first, second, third, and fourth transistors of one conductivity type and fifth, sixth, seventh, eighth, ninth, tenth, eleventh and twelfth transistors of another conductivity type, each of said transistors having a base, an emitter, and a collector; a first resistive impedance element connected to the emitters of said first and second transistors; a second resistive impedance element connected to the emitters of said third and fourth transistors; a third resistive impedance element connected to the emitters of said fifth and sixth transistors and to the collector of said first transistor; a fourth resistive impedance element connected to the emitters of said seventh and eighth transistors and to the collector of said second transistor; a fifth resistive impedance element connected to the collectors of said sixth and seventh transistors and to the base of said fourth transistor; a sixth resistive impedance element connected to the collectors of said fifth and ninth transistors; a seventh resistive impedance element connected to the emitters of said ninth and tenth transistors and to the collector of said third transistor; an eighth resistive impedance element connected to the emitters of said eleventh and twelfth transistors and to the collector of said fourth transistor; a ninth resistive impedance element connected to the collectors of said tenth and eleventh transistors; a first signal input circuit connected to the base of said second transistor for conveying first binary signals thereto operative to determine the state of conduction of said second transistor; second signal input circuit means connected to the bases of said sixth and eighth transistors for conveying second binary signals thereto operative to control the state of conduction of said sixth transistor only when said first transistor is non-conductive and the state of conduction of said eighth transistor only when said second transistor is non-conductive; third signal input circuit means connected to the bases of said tenth and twelfth transistors for conveying third binary signals thereto operative to control the state of conduction of said tenth transistor only when said third transistor is non-conductive and the state of conduction of said twelfth transistor only when said fourth transistor is nonconductive; a first signal output circuit connected to said ninth resistive impedance element for developing a "sum" output signal in response to a change in the state of conduction of said tenth or said eleventh transistor; a second signal output circuit connected to said sixth resistive impedance element for developing a "carry" output signal in response to a change in the state of conduction of said fifth or said ninth transistor; and bias means maintaining the bases of said first, third, fifth, seventh, ninth, and eleventh transistors at substantially constant potentials.

19. A circuit in accordance with claim 18 wherein: said first, second, third, and fourth transistors are PNP junction transistors; said fifth, sixth, seventh, eighth, ninth, tenth, eleventh, and twelfth transistors are NPN junction transistors; said impedance elements are resistors; and including voltage means connected to said third, fourth, seventh, and eighth resistors for providing substantially constant current sources.

No references cited.